US010991142B1

(12) United States Patent
Harrison et al.

(10) Patent No.: US 10,991,142 B1
(45) Date of Patent: Apr. 27, 2021

(54) COMPUTER-IMPLEMENTED ESSENCE GENERATION PLATFORM FOR POSTHUMOUS PERSONA SIMULATION

(71) Applicants: Justin Harrison, Woodland Hills, CA (US); Daniel Whitaker, Duvall, WA (US)

(72) Inventors: Justin Harrison, Woodland Hills, CA (US); Daniel Whitaker, Duvall, WA (US)

( * ) Notice: Subject to any disclaimer, the term of this patent is extended or adjusted under 35 U.S.C. 154(b) by 0 days.

(21) Appl. No.: 16/903,372

(22) Filed: Jun. 16, 2020

(51) Int. Cl.
  *G06T 13/40* (2011.01)
  *G06F 16/95* (2019.01)
  *G06N 20/00* (2019.01)
  *G06F 16/9535* (2019.01)
  *G06T 19/00* (2011.01)

(52) U.S. Cl.
  CPC .......... *G06T 13/40* (2013.01); *G06F 16/9535* (2019.01); *G06N 20/00* (2019.01); *G06T 19/006* (2013.01)

(58) Field of Classification Search
  None
  See application file for complete search history.

(56) References Cited

U.S. PATENT DOCUMENTS

| | | | |
|---|---|---|---|
| 9,696,795 | B2 | 7/2017 | Marcolina et al. |
| 9,996,797 | B1 | 6/2018 | Holz et al. |
| 10,298,911 | B2 | 5/2019 | Shuster et al. |
| 2008/0161944 | A1 | 7/2008 | Lutnick |
| 2008/0269958 | A1* | 10/2008 | Filev ............ B60W 50/10 701/1 |
| 2009/0299932 | A1 | 12/2009 | Hodge et al. |
| 2012/0194418 | A1 | 6/2012 | Osterhout et al. |
| 2012/0194549 | A1 | 8/2012 | Osterhout et al. |
| 2013/0257877 | A1* | 10/2013 | Davis ............ G06N 3/006 345/473 |

(Continued)

OTHER PUBLICATIONS

Meese et al. , "Posthumous personhood and the affordances of digital media". Mortality 20.4 (2015): 408-420., "Meese"). (Year: 2015).*

(Continued)

*Primary Examiner* — Tapas Mazumder
(74) *Attorney, Agent, or Firm* — Patent Ingenuity, P.C.; Samuel K. Simpson

(57) ABSTRACT

A computer-implemented process generates a posthumous virtual simulation of a human user. The process captures, via a processor-implemented essence data capture engine during a life of the human user, personality data and interaction data. The personality data connotes one or more core characteristics of the human user, whereas the interaction data connotes one or more interactive characteristics of the human user that are present during one or more real-world interactions with a distinct human user. Furthermore, the process generates, via a processor-implemented essence generation engine, a virtual persona model of the human user based upon the personality data and the interaction data. Additionally, the process generates, via a processor-implemented neural network engine, a neural network that posthumously simulates a virtual persona of the human user based on the virtual persona model during a virtual interaction between the distinct human user and a virtual representation of the human user.

18 Claims, 10 Drawing Sheets

(56) References Cited

U.S. PATENT DOCUMENTS

| | | |
|---|---|---|
| 2015/0324692 A1 | 11/2015 | Ritchey et al. |
| 2017/0185261 A1 | 6/2017 | Perez et al. |
| 2018/0288211 A1 | 10/2018 | Kim |
| 2019/0108251 A1* | 4/2019 | Yared ................. G06F 16/2379 |
| 2019/0228330 A1 | 7/2019 | Kaifosh et al. |
| 2019/0384389 A1 | 12/2019 | Kim et al. |
| 2020/0065394 A1 | 2/2020 | Calderon et al. |
| 2020/0074369 A1* | 3/2020 | Arcolano ............... G06N 20/10 |
| 2020/0242471 A1* | 7/2020 | Busch ...................... G06N 3/08 |
| 2020/0265526 A1 | 8/2020 | Ogunsusi |
| 2020/0306640 A1 | 10/2020 | Kolen |

OTHER PUBLICATIONS

Pardes, Arielle, "The Emotional Chatbots Are Here to Probe Our Feelings," https://www.wired.com/story/replika-open-source/, Jan. 31, 2018.

https:1/www.thesun.co.uk/tech/5681776/griefbots-messages-dead-roman-mazurenko/ "Text in Peace How 'griefbots' let us chat to the dead from our phones . . . but would you leave a 'digital twin' of yourself behind when you die?" George Harrison (Year: 2018).

https://apps.apple.com/us/app/roman-mazurenko/id958948383 Apple App Store: Roman Mazurenko App (Year: 2017).

Hellard, Bobby, "How an episode of 'black mirror' became a creepy reality," https://i-d.vice.com/en_us/article/nepbdg/black-mirror-artificial-intelligence-roman-rnazurenko (Year: 2018).

Park, Gregory, et al., "Automatic Personality Assessment Through Social Media Language" Journal of Personality arid Social Psychology (Year: 2014).

* cited by examiner

| Variability Pattern | Range of Keywords | Range of Response Times | Sentiment Range | Emphatic Behavior Range | Predicted Persona Output | Predicted Persona Mannerisms |
|---|---|---|---|---|---|---|
| A | "xxxx", "yyyy" | 0s to 10s | Happy | High | "xxxx" | Smile |
| B | "zzzz" | 0s to 30s | Sad | Medium | "zzzz" | Frown |
| ............ | | | | | | |
| N | "iiii" | 5s to 45s | Indifferent | Low | "iiii" | Neutral |

|  | Actual Response | | |
|---|---|---|---|
| | Laughter | Crying | Hesitation |
| Predicted Response — Laughter | 90% | 15% | 2% |
| Predicted Response — Crying | 8% | 70% | 3% |
| Predicted Response — Hesitation | 2% | 5% | 95% |

COMPUTER-IMPLEMENTED ESSENCE GENERATION PLATFORM FOR POSTHUMOUS PERSONA SIMULATION

BACKGROUND

1. Field

This disclosure generally relates to the field of computing systems. More particularly, the disclosure relates to artificial intelligence ("AI") systems.

2. General Background

With recent advances in computing ability, a variety of configurations have attempted to remove the need for human-to-human interactivity in favor of human-to-AI interactivity, specifically with respect to business transactions. For example, a variety of business-related software applications (e.g., banking, insurance, e-commerce, etc.) allow a user operating a computing device (e.g., desktop computer, laptop computer, smartphone, tablet device, smartwatch, etc.) to interact with a chatbot, which is generally deemed to be a software application operated by an AI. A human user may ask the chatbot various questions, which may be general in nature, account specific, product specific, service specific, etc.; subsequently, the chatbot may respond with an answer to that question. The dialogue between the human user and the chatbot typically takes the form of a text-based dialogue.

Even though the responsiveness of the chatbot may be as fast, or even faster, than that of a human agent, it often is limited in the interaction it can provide to a human user. For example, a user may have a question that is atypical of what most other users ask, and for which the chatbot does not have any answer; in such an instance, the chatbot may transition the dialogue to a human agent that can interact better with the human user.

Although some current chatbot configurations may be convincing enough to pass the Turing test (an evaluation to determine whether or not the chatbot's behavior is indistinguishable from that of a human being) in certain circumstances, as noted above, they are for the most part convincing because they simulate a stranger to that of the user. In other words, a user having a text-based dialogue with an agent about the user's account has no baseline of comparison other than how a human agent would answer account-specific questions. And even in those instances, a human agent often reads from an introductory script and provides standardized information. In other words, in a business-related dialogue, a chatbot may be able to simulate, with some degree of efficacy, the behavior of a customer service agent that is most likely a stranger to the user.

However, in more personal settings outside of the foregoing customer service contexts, current chatbots are easily identified by a human user. The reason for this is that personal interactions typically go beyond fact-based questions and answers. As much as current chatbot configurations may attempt to use colloquial phrases and verbiage, their behavior during an interaction with a human user is essentially limited to simulating interaction with a stranger.

As a result, current AI configurations are only able to simulate a generic version of a human's personality, and do so with realism that is limited to specific contexts and a minute level of functionality.

SUMMARY

In one embodiment, a computer-implemented process is provided. The computer-implemented process generates a posthumous virtual simulation of a human user. The process captures, via a processor-implemented essence data capture engine during a life of the human user, personality data and interaction data. The personality data connotes one or more core characteristics of the human user, whereas the interaction data connotes one or more interactive characteristics of the human user that are present during one or more real-world interactions with a distinct human user. Furthermore, the process generates, via a processor-implemented essence generation engine, a virtual persona model of the human user based upon the personality data and the interaction data. Additionally, the process generates, via a processor-implemented neural network engine, a neural network that posthumously simulates a virtual persona of the human user based on the virtual persona model during a virtual interaction between the distinct human user and a virtual representation of the human user.

In another embodiment, a computer program product comprises a non-transitory computer useable storage device having a computer readable program. When executed on a server computer, the computer readable program causes the server computer to perform the foregoing process. In yet another embodiment, a system has a processor, an essence data capture engine, an essence generation engine, and a neural network engine that execute the foregoing process.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 4 illustrates the essence generation engine generating a variability pattern data structure that has a plurality of variability patterns, a plurality of ranges of potential input values from the distinct human user corresponding to each of the plurality of variability patterns, and a plurality of predicted outputs of the human user corresponding to each of the plurality of ranges of potential inputs values for each of the variability patterns.

FIG. 5B illustrates an example of the confusion matrix.

DETAILED DESCRIPTION

Figure 1:
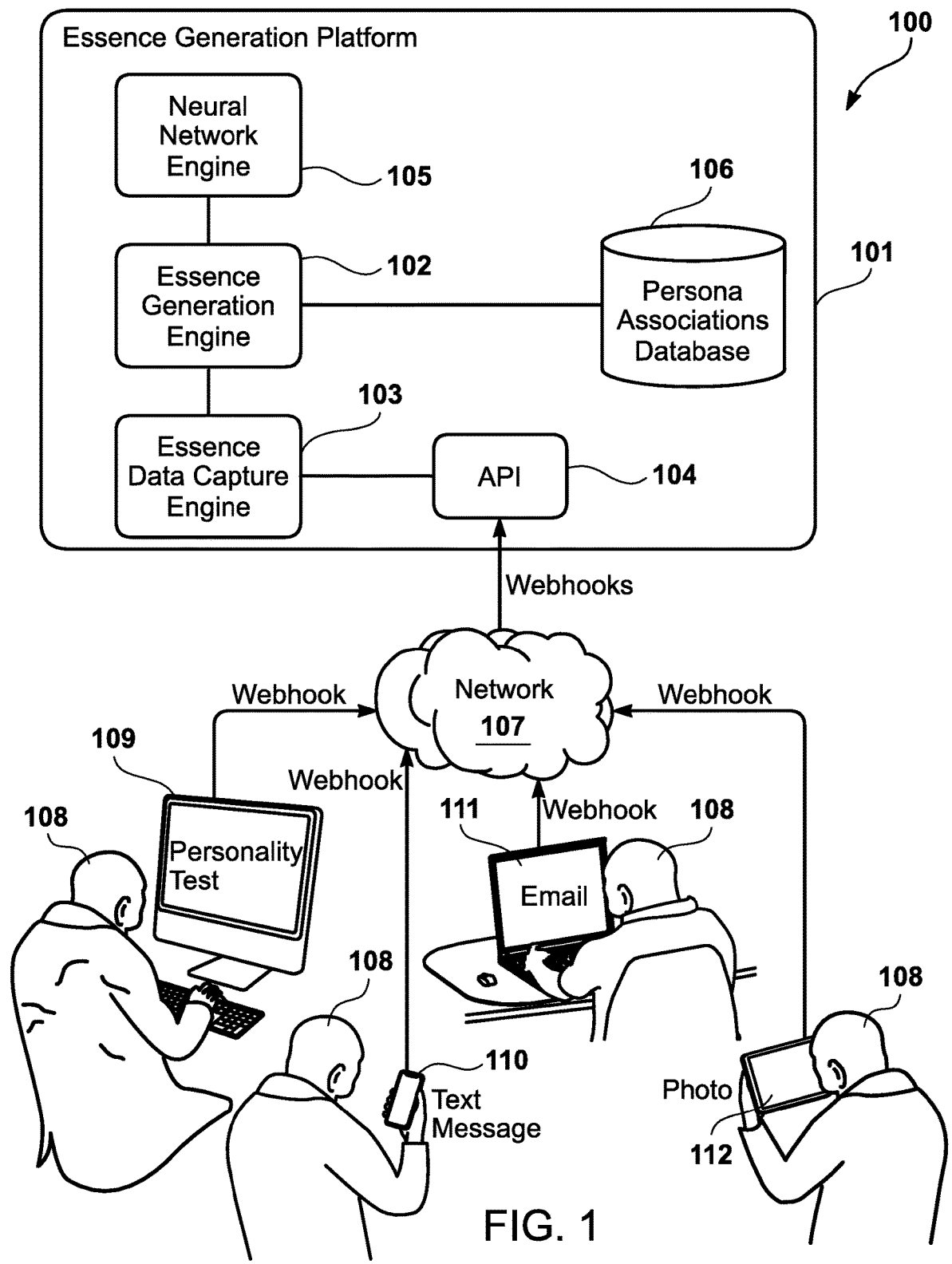
FIG. 1 illustrates an essence generation configuration that may be utilized to capture data from a human user during his or her life.

A computer-implemented essence generation platform provides for realistic posthumous simulation of a persona (e.g., a family member, friend, co-worker, etc.) of a human being. In other words, the essence generation platform captures the essence of a persona, while a person is living, to allow for a distinct user to interact with that persona in a posthumous manner. By way of contrast with previous chatbot configurations, the essence generation platform goes beyond fact-based questions and answers, and customizes interactions with the particular user. The essence generation platform recognizes that a persona is not static with respect to interactions with all individuals, but rather may be quite different with respect to interactions with different live users. For example, the persona, while living, may have spoken with a first set of mannerisms to relatives, and a second, different set of mannerisms to coworkers. Rather than having a universal set of rules for interactions with all users, the essence generation platform captures and processes the disparities amongst the interactions of the persona and various users, thereby allowing for the adaptive generation of interactions, which are dependent upon the particular user that is interacting posthumously with the persona. This adaptive interaction provides a sense of realism for the user—giving him or her a realistic sense of actual interaction with the persona. And the user is able to sense the realism of such interaction because he or she would have been used to one or more parameters that were often present in previous interactions during the life of the human user having the persona. For example, the sense of realism stems not only from a knowledge base of facts known to the human user associated with the persona, but also from various persona mannerisms, such as response speed, memory retrieval, response length or brevity, dialogue interjection frequency, patience, tone, attitude, levity, or the like.

Yet, the computer-implemented essence generation platform recognizes that capturing and processing the foregoing persona mannerisms cannot reasonably be accomplished via a set of discrete rules with binary outcomes. Instead, the essence generation platform may be implemented according to a non-discrete (e.g., fuzzy logic) configuration. Given the potentially infinite possible ways that a persona may interact posthumously with a particular human, living user, this heuristic approach more accurately generates realistic virtual interactions than a discrete, static logic approach. Unlike most software applications, humans do not always respond the exact same way to the same stimulus. A question provided to a human being on one day of the week may yield a very different answer from the same human being on a different day of the week, for no apparent reason; yet, at other times, such fluctuation may be attributed to a particular reason, such as a distinctive emotion on the different day. The essence generation platform captures such human variability with a data-driven approach that dynamically generates patterns of the virtual persona subsequent to capturing the persona data. In other words, the essence generation platform does not start with a set of predefined patterns and then search for those patterns within the data to generate a virtual persona; rather, it starts with analyzing the data and allows patterns to be determined organically from the data. Not only will those patterns likely differ from virtual persona to virtual persona, but also from the interactions between the same virtual persona and different individuals.

Accordingly, the computer-implemented essence generation platform generates variability patterns, rather than universal, predefined patterns, that have a high likelihood of being attributed to a virtual persona when interacting with a particular individual. The sense of realism stems not from whether or not the virtual persona answers every question correctly, but rather whether the virtual persona effectively simulates the personality of deceased individual. Sometimes, the virtual persona should answer a question correctly, while at other times possibly should be forgetful. At times, the virtual persona should patiently wait for the user to finish asking a question before answering, while at other times possibly should quickly interject. (The foregoing mannerisms are provided only as a subset of the many possible mannerisms of a virtual persona.) The essence generation platform generates such variability patterns from the captured data for use as dynamically generated rules.

FIG. 1 illustrates an essence generation configuration 100 that may be utilized to capture data from a human user 108 during his or her life. In particular, a computer-implemented essence generation platform 101 may have an essence data capture engine 103 that is utilized to capture data regarding both core personality characteristics and specific interaction-based characteristics during the life of the human user 108. (Alternatively, some, if not all, of the interaction-based characteristics may be determined posthumously by performing an analysis on previous interactions between the human user 108 and a particular, distinct human user.) In one embodiment, the essence data capture engine 103 may be associated with an application programming interface ("API") 104, which provides access to various functions that may be used to automatically capture essence data corresponding to the human user 108. For instance, the human user 108 may operate a variety of computing devices, which may capture the essence data via one or more webhooks that make function calls to the API 104. As an example, the human user 108 may operate a computing device, such as a desktop computer 109, which has software for generating a personality test. Accordingly, during the life of the human user 108, he or she may take one or more personality tests to establish one or more core characteristics particular to the persona of the human user 108; these core characteristics are characteristics that form a basis for the persona of the human user 108, independent of specific interactions with other human users. Amongst a myriad of possible examples, core characteristics may include certain phrases, tone of voice, ranges for response times, etc. that form a universal common denominator for the human user amongst interactions with a significant number (i.e., exceeding a predetermined threshold) of people. The core characteristics may be based solely on personality tests, or, additionally or alternatively, on interactions with other humans. For instance, during his or her life, the human user 108 may have performed a number of interactions with other users via various input modalities, such as text messaging, email, and image transmissions via various computing devices, such as a smartphone 110, a laptop computer 111, and a tablet device 112, respectively. (The illustrated computing devices are provided only as examples. The same, or different, computing devices may be utilized for different input modalities. Furthermore, additional data capture devices, such as video capture devices for video recording and audio capture devices for audio recording, may also be utilized.) Webhooks may be similarly implemented via software applications executed by these computing devices to make function calls to the API 104 to perform essence data capture via the essence data capture engine 103 via the network 107.

Furthermore, the webhooks may be activated to capture specific interaction data particular to certain interactions with a specific individual. In other words, the essence data capture engine 103 may be utilized to specifically capture data to determine the essence of the persona of the human user 108 when interacting with a specific individual, which may be quite different than when interacting with other individuals. In an alternative embodiment, the function calls to the API 104 may be performed without webhooks.

The essence generation engine 102, which is in operable communication with the essence data capture engine 103, may then generate a virtual persona model of the human user based upon at least two factors: personality data connoting the one or more core characteristics of the human user 108 and interaction data connoting one or more interactive characteristics of the human user 108 with other specific users. Accordingly, the virtual persona model may have a base layer, corresponding to the personality data, and a various specific human user layers, corresponding to interaction data for a specific user. The virtual persona model may inherit all of the core characteristics, while adapting to specific interaction data based upon the specific user that a virtual representation of the human user 108 may be interacting with. In one embodiment, the essence generation engine 102 may utilize a blending ratio to determine particular percentages of each type of characteristic. For example, a blending ratio of eighty-twenty may indicate that eighty percent of a dialogue with a specific user automatically should be driven by the interaction characteristics, while twenty percent of the interactions automatically should be driven by the core characteristics. (The eighty-twenty blending ratio is just one example of many possible ratios of possible blending.) By having such a blend of characteristics, the dialogue between the virtual representation of the human user 108 and a specific human user appears more realistic from a variability perspective. In other words, even though a particular human user would expect the human user 108 to respond in a certain way, human variability allows for the possibility that the human user 108 would not always respond the same way, but may still respond in a way that is consistent with his or her core personality attributes, thereby providing a sense of realism for the simulation. In an alternative embodiment, the essence generation engine 102 generates the virtual persona model solely based on the interaction attributes, without reference to core attributes. In other words, the essence generation engine 102 may focus solely on interactions that the human user 108 had with different humans on a per-human basis, thereby defining a plurality of virtual personas of the human user 108 depending on the particular user with which the human user 108 participates in a dialogue.

Finally, based on the virtual personal model generated by the essence generation engine 102, the neural network engine 105, which is in operable communication with the essence generation engine 102, posthumously simulates the virtual persona of the human user 108 during a virtual interaction between a distinct human user and a virtual representation of the human user 108. In particular, the neural network engine 105 may access a virtual persona associations database 106 in which the essence generation engine 102 stores the virtual persona model. For instance, the essence generation engine 102 may dynamically generate one or more variability patterns, without the one or more variability patterns being defined prior to capturing the personality data and/or the interaction data, subsequent to the essence data capture engine 102 capturing at least a portion of the personality data and at least a portion of the interaction data. In other words, the essence generation engine 102 may be configured to utilize a data-driven approach to determine variability patterns (i.e., ranges of potentially realistic responses rather than binary outcomes) after data starts being captured by the essence data capture engine 103 and/or processed by the essence generation engine 102. Rather than having pre-defined patterns, which are likely not applicable to individualized interactions between the human user 108 and distinct users, the essence generation engine 102 develops patterns that are most pertinent to particular dialogues after beginning to analyze those dialogues. Additionally, in one embodiment, the essence generation engine 102 may wait for the virtual persona model to be built according to one or more criteria prior to providing the virtual persona model to the neural network engine 105. For example, the essence generation engine 102 may analyze the virtual persona model according to a redundancy threshold to determine if one or more persona utterances/behaviors have been repeated a certain number of times throughout various interactions between the human user 108 and the distinct, additional user. After this saturation point, the essence generation engine 102 may determine that the human user 108 is prone to a particular response, and that additional data capture is unnecessary and would lead to data storage redundancies. Accordingly, the essence generation engine 102 optimizes the performance of the essence generation platform 101, which may be implemented as a server computer.

Figure 2:
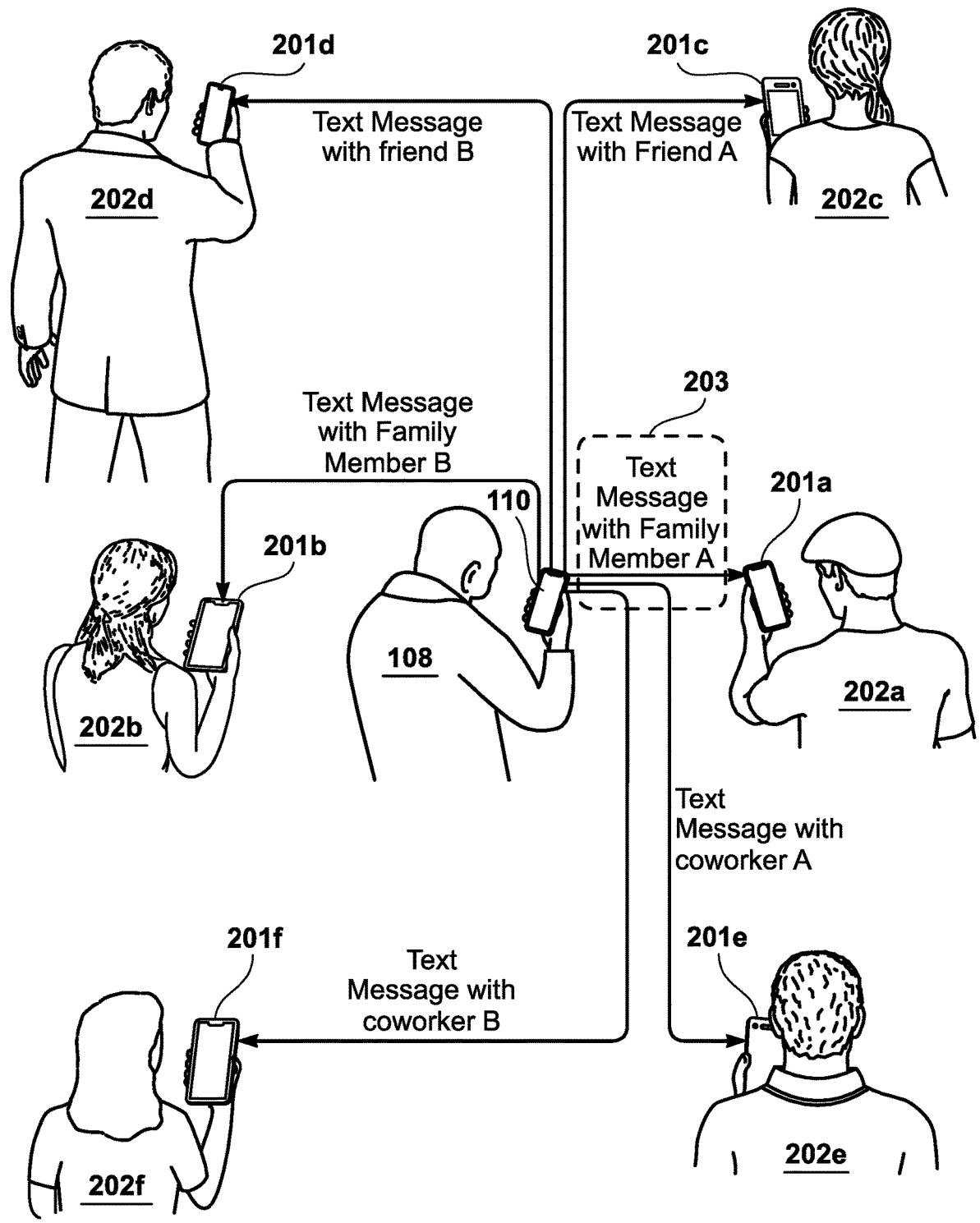
FIG. 2 illustrates an example of possible interactions between the human user and various distinct, human users.

FIG. 2 illustrates an example of possible interactions between the human user 108 and various distinct, human users. In particular the example is directed toward analyzing text message interactions; however, other types of interactions (e.g., voice, video, etc.) may be analyzed in addition or in the alternative. For example, the human user 108 may utilize the smartphone 110 to send text messages to various other smartphones 201a-f, each corresponding to a distinct, human user such as a first family member 202a, a second family member 202b, a first friend 202c, a second friend 202d, a first coworker 202e, and a second coworker 202f. The essence data capture engine 103, illustrated in FIG. 1, may capture all of these interactions, but may filter out interactions as a filtered interaction data set 203 corresponding to the human user 108 and one particular distinct, human user, such as, for example, the first family member 202a. By performing such a filtering process, the essence data capture engine 103 may provide the most pertinent data set to the essence generation engine 102 to generate the virtual persona model based upon a particular user interaction. In another embodiment, the core characteristics are determined based partially on an analysis of the interactions between the human user 108 and a group of individuals; those core characteristics then may be used in conjunction with the filtered user interactions for a distinct, human user, such as part of a blending ratio.

Figure 3:
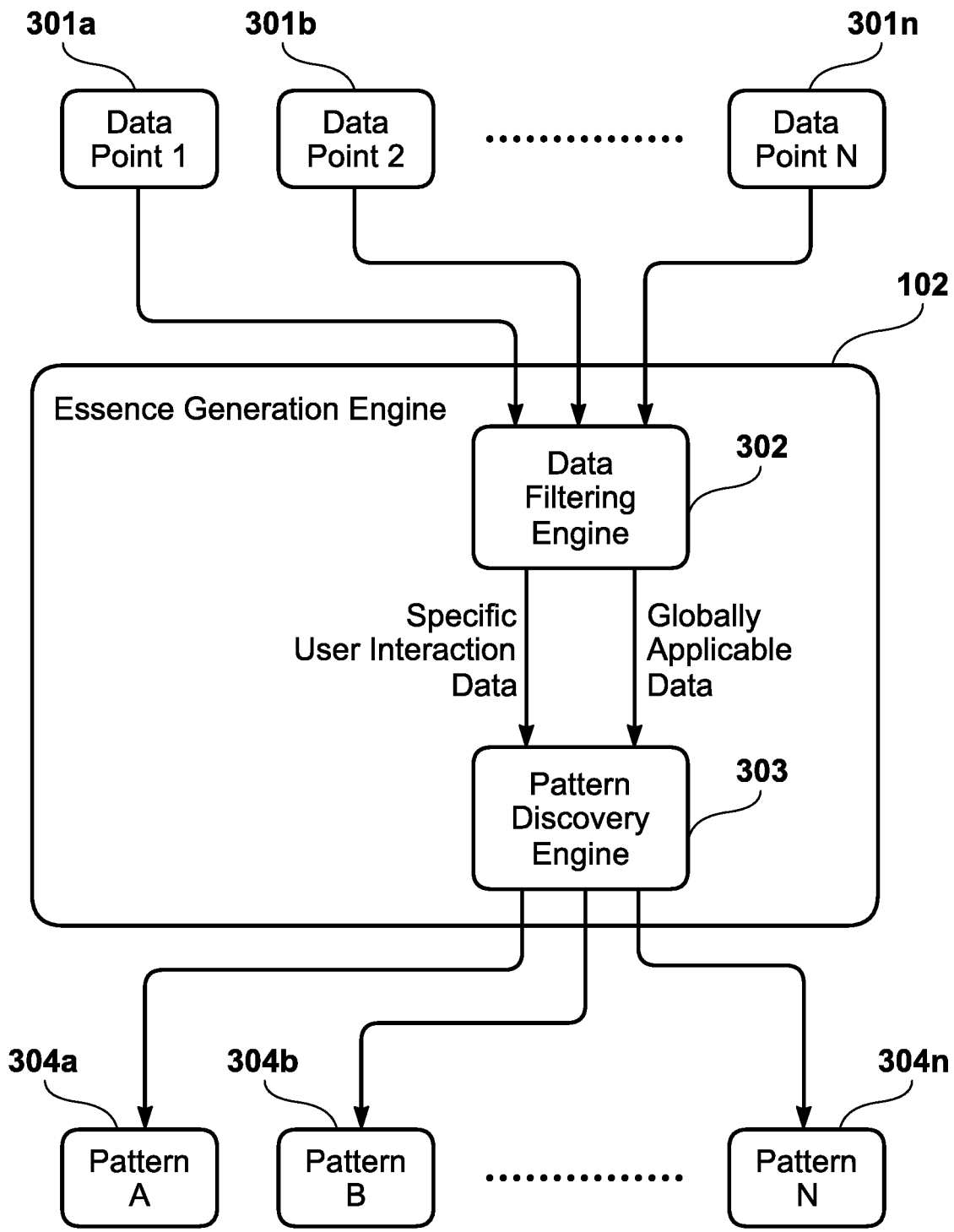
FIG. 3 illustrates the essence generation engine capturing a plurality of data points, such as from the interactions illustrated in FIG. 2.

Based on one or more of various essence data capture methodologies, the essence generation engine 102, as illustrated in FIG. 3, captures a plurality of data points 301a-n, such as from the interactions illustrated in FIG. 2. For instance, in one embodiment, the essence generation engine 102 may have a data filtering engine 302 that may filter the interaction data according to one or more filtering criteria, as described with respect to FIG. 2. The data filtering engine 302 may then provide that specific user interaction data to a pattern discovery engine 303. Additionally, the data filtering engine 302, or another component, may allow the globally applicable data (i.e., all user interaction data for a given group) to pass through to the pattern discovery engine 303. Accordingly, the pattern discovery engine 303 may heuristically discover possible patterns that the human user 108 has when interacting with a particular individual, a group of individuals, or both. The pattern discovery engine 303 may then output the various variability patterns 304a-n.

As a result of the variability patterns 304a-n discovered by the essence generation engine 102 in FIG. 3, the essence generation engine 102 may generate a variability pattern data structure 400, as illustrated in FIG. 4, that has the plurality of variability patterns 304a-n, a plurality of ranges of potential input values from the distinct human user corresponding to each of the plurality of variability patterns, and a plurality of predicted outputs of the human user 108 corresponding to each of the plurality of ranges of potential inputs values for each of the variability patterns. As examples of input values, ranges of keywords/phrases, ranges of response times, sentiment, and emphatic behavior (e.g., tone, emojis, etc.) may be utilized to determine potential utterances of the human user 108. Furthermore, the essence generation engine 102 may predict potential persona outputs (e.g., text messages, voice reactions, facial expressions in a video, etc.) and/or predicted persona mannerisms (e.g., sighing, smiling, frowning, laughing, crying, etc.).

Figure 5A:
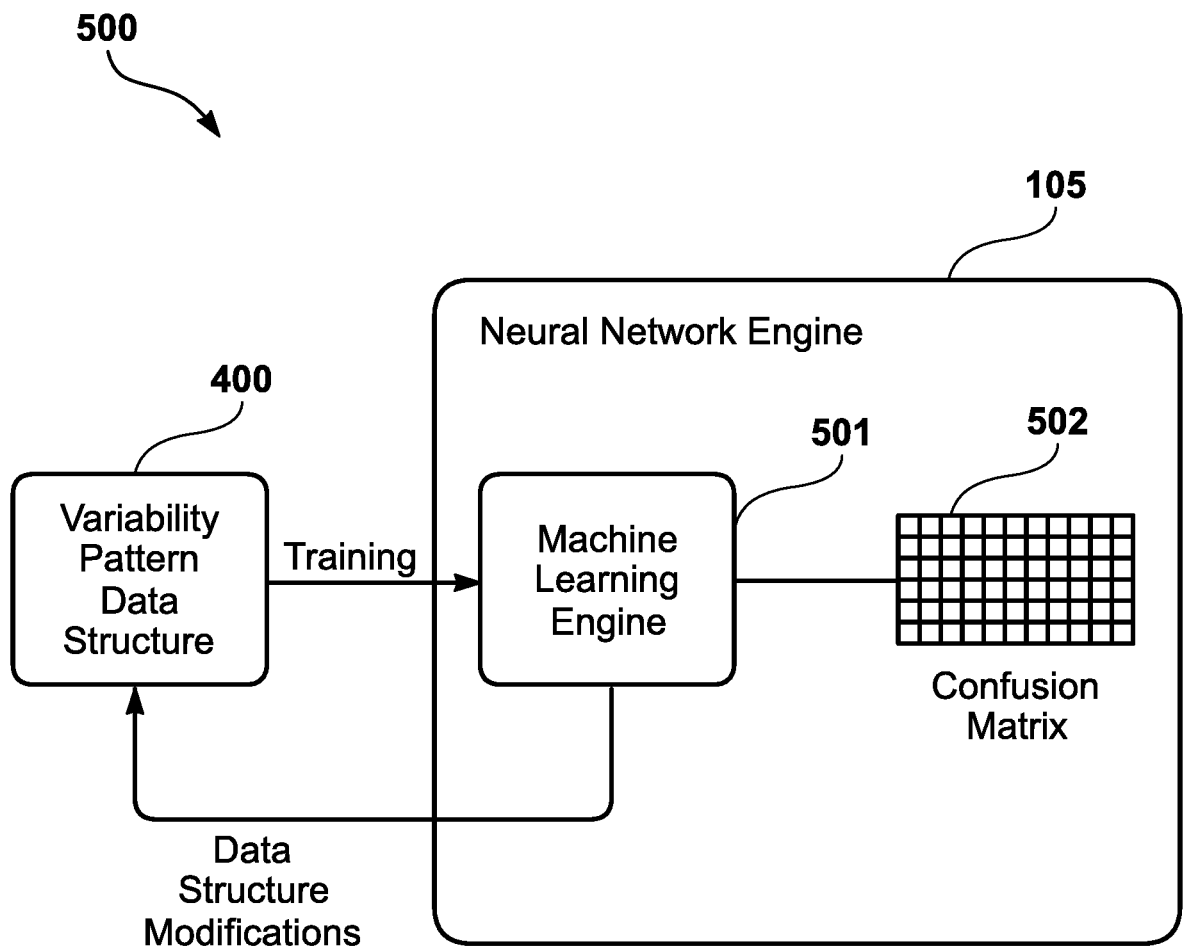
FIG. 5A illustrates the neural network engine having a machine learning engine that receives the variability pattern data structure.

FIGS. 5A and 5B illustrate the neural network engine 105 being trained according to the variability pattern data structure 400 generated by the essence generation engine 102, illustrated in FIG. 4. In particular, FIG. 5A illustrates the neural network engine 105 having a machine learning engine 501 that receives the variability pattern data structure 400. Accordingly, the machine learning engine 501 is trained according to the variability pattern data structure 400. Upon being trained, the machine learning engine 501, or another component, may generate a confusion matrix 502 that determines predictive accuracy of the plurality of predicted outputs based upon a predictive accuracy threshold being met. For example, FIG. 5B illustrates an example of the confusion matrix 502. Each column may be an actual response, and each row may be a predicted response. The intersection of a row and a column indicates the statistical accuracy of a given response. For example, out of all of the actual laugher responses (i.e., the actual amount of times that the human user 108 laughed in previous interactions captured by the essence data capture engine 103) in the variability pattern data structure 400, the confusion matrix 502 indicates that the neural network engine 105 accurately predicted laugher ninety percent of the time, but mistakenly predicted crying as laugher eight percent of the time and hesitation as laughter two percent of the time. (Other examples are illustrated in the confusion matrix 502. However, these are only examples, since a variety of other actual and predicted responses may be utilized instead.)

Figure 6:
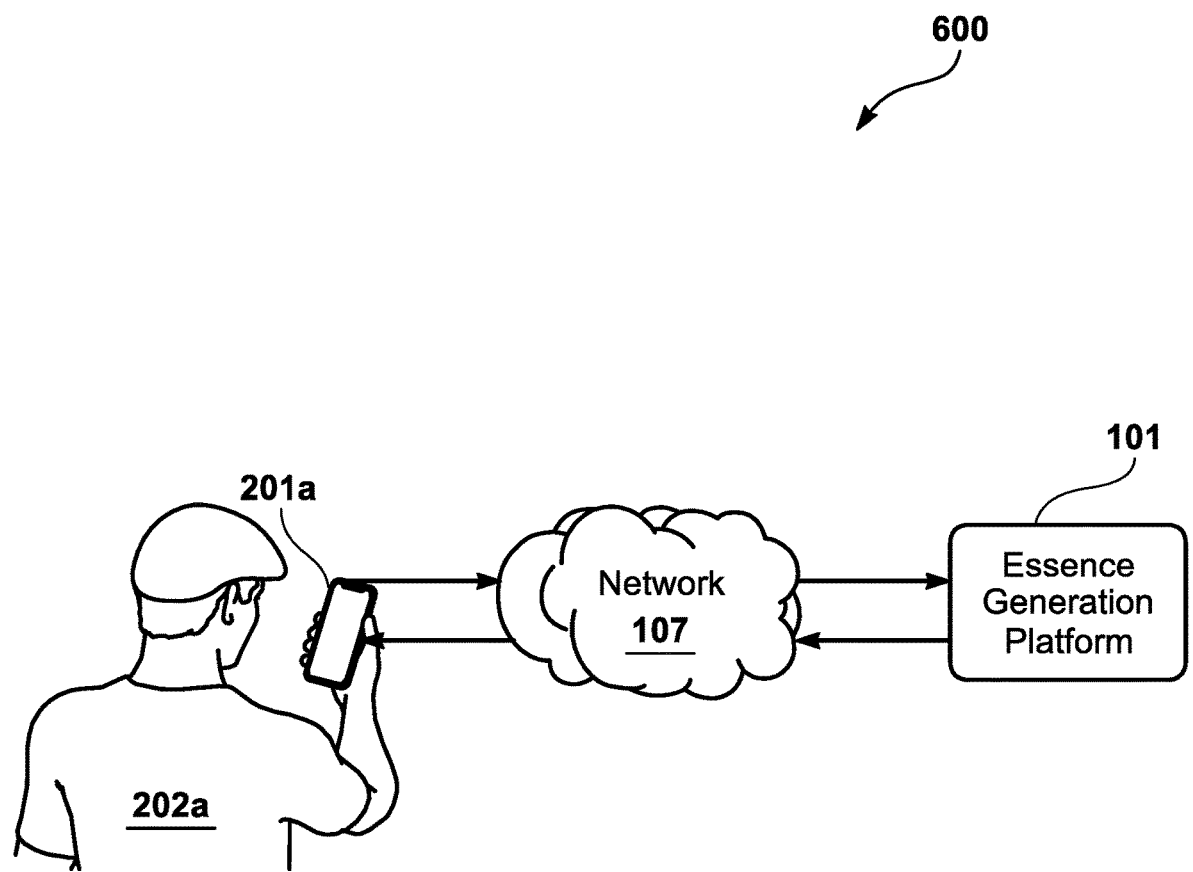
FIG. 6 illustrates an example of a posthumous persona simulation configuration that generates a posthumous simulation for a virtual persona corresponding to the human user when interacting with the first family member, as an example.

FIG. 6 illustrates an example of a posthumous persona simulation configuration 600 that generates a posthumous simulation for a virtual persona corresponding to the human user 108 when interacting with the first family member 202a, as an example. (Other family members, friends, co-workers, etc. may be utilized instead.) The posthumous persona simulation is intended to simulate the persona of the human user 108 such that the first family member 202a has a realistic interaction with the human user 108 as if the human user 108 was alive. The interaction goes far beyond knowledge (e.g., facts) that the human user 108 would know—it extends to the mannerisms, tone, sentiment, and a variety of other factors that may all potentially contribute to the dynamic that existed between the human user 108 and the first family member 202a. Ultimately, the posthumous persona simulation configuration 600 provides the impression to the first family member 202a that he or she is actually having an interactive dialogue with the human user 108.

In one embodiment, a computing device 201a operated by the first family member 202a may have a software application stored therein that is programmed to communicate, via the network 107, with the essence generation platform 101. Although the computing device 201a is illustrated as a smartphone, a variety of other types of computing devices may be utilized instead. Furthermore, the essence generation platform 101 may be configured to operable via a variety of different types of software and operating systems, potentially written in different computer languages. Additionally, the software application stored on the computing device 201a is not tied to any particular graphical user interface ("GUI"), but instead may be operated with a variety of different GUIs.

Furthermore, the user that interacts with the virtual persona via the posthumous persona simulation configuration 600 does not have to be a user via which data was captured through the essence data capture engine 102, illustrated in FIG. 1. For example, the user may be a great grandson that only learned about his great grandfather through stories told to him by his father. Accordingly, based on interaction data captured for the human user 108 and his grandson, the posthumous persona simulation configuration 600 may generate a simulation for the great grandson.

Figure 7:
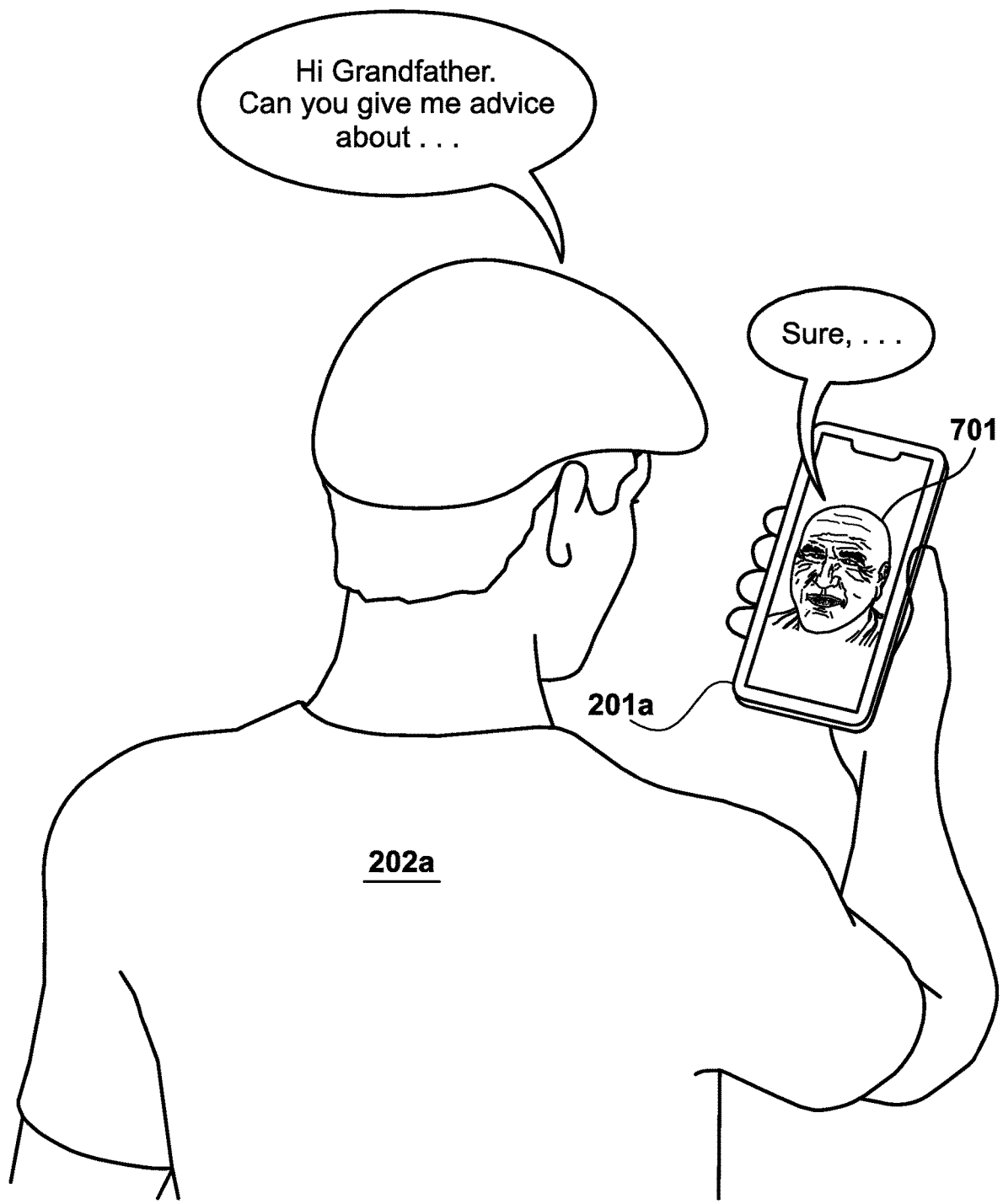
FIG. 7 illustrates an expanded view of the interaction illustrated in FIG. 6.

FIG. 7 illustrates an expanded view of the interaction illustrated in FIG. 6. As an example, a video conference modality is utilized to provide an image-based output modality. Accordingly, the first family member 202a may interact with an image-based representation 701 of his grandfather. Not only conveying similar words and phrases to that of the human user 108, the posthumous persona simulation configuration 600 generates similar behaviors (e.g., facial expressions, hand gestures, tone, etc.). As another example, the output modality may be voice-based. Accordingly, without seeing an image of the human user 108, the first family member 202a may still hear various audio outputs (laughs, cries, hesitations, etc.) typically associated with his or her interactions with the human user 108. As yet another example, the output modality may be text-based. The first family member 202a may interact with the virtual persona of the human user 108 at a similar pace (e.g., typical response times for text messages) and with similar syntax and semantics (e.g., use of exclamations points, capitalization of certain words/phrases, emojis, etc.). Various other modalities may be utilized other than those described herein, which are intended only as examples.

Figure 8:
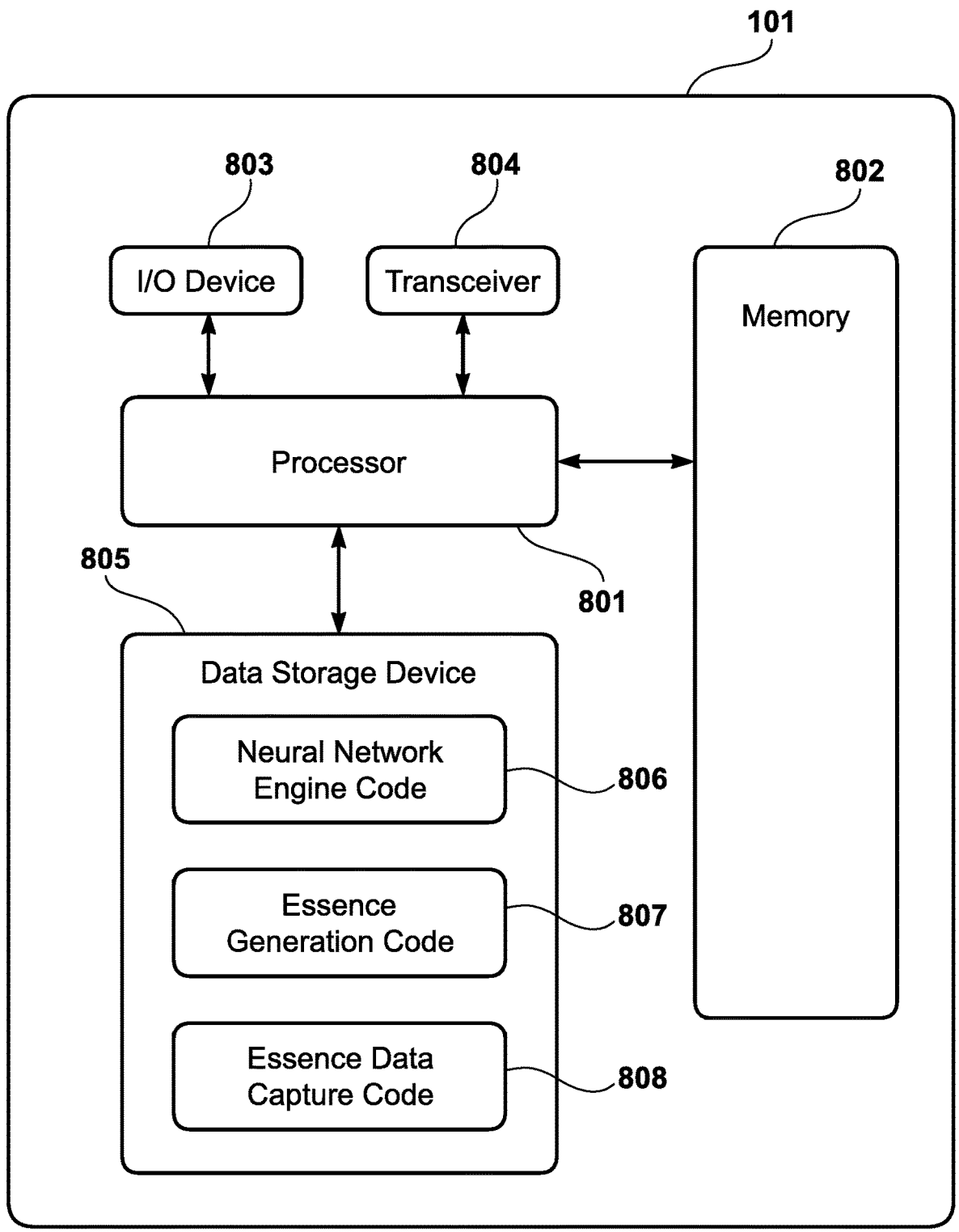
FIG. 8 illustrates a system configuration for the essence generation platform, which may be implemented as a server computer, illustrated in FIG. 1.

FIG. 8 illustrates a system configuration for the essence generation platform 101, which may be implemented as a server computer, illustrated in FIG. 1A. The essence generation platform 101 may have a processor 801, which may be specialized for data capture, variability pattern discovery, and machine learning. Accordingly, the processor 801 may be used to perform the operations illustrated in FIG. 1 for generating an essence for a virtual persona of the human user 108 for posthumous virtual simulation via one or output modalities.

The system configuration may also include a memory device 802, which may temporarily store the variability data structure 400, illustrated in FIG. 4, and/or the confusion matrix 502. As a result, the essence generation platform 101 is able to utilize optimal data structures for generating a virtual persona of the human user 108. Although the data capture process and machine learning process may not necessarily be performed in real-time, the virtual posthumous simulation of the human user 108 is performed in real-time (without a humanly perceivable delay), or substantially real-time (with only a slight humanly perceivable delay (e.g., one to two seconds). To appear as an indistinguishable, or almost indistinguishable, virtual representation of the human user 108, the simulation has to be performed with adequate speed to accurately mimic the response/hesitation times of the human user 108.

Furthermore, the memory device 802 may store computer readable instructions performed by the processor 801. As an example of such computer readable instructions, a data storage device 805 within the system configuration may store neural network engine code 806, essence generation code 807, and essence data capture code 808. The processor 801 may execute the neural network engine code to generate and operate the neural network engine 105, the essence generation code 807 to generate and operate the essence generation engine 102, and the essence data capture code to generate and operate the essence data capture engine 103, all of which are illustrated in FIG. 1.

Finally, the system configuration may have one or more input/output ("I/O") devices 803 that may receive inputs and provide outputs. Various devices (e.g., keyboard, microphone, mouse, pointing device, hand controller, joystick, display device, holographic projector, etc.) may be used for the I/O devices 803. The system configuration may also have a transceiver 804 to send and receive data. Alternatively, a separate transmitter and receiver may be used instead.

Figure 9:
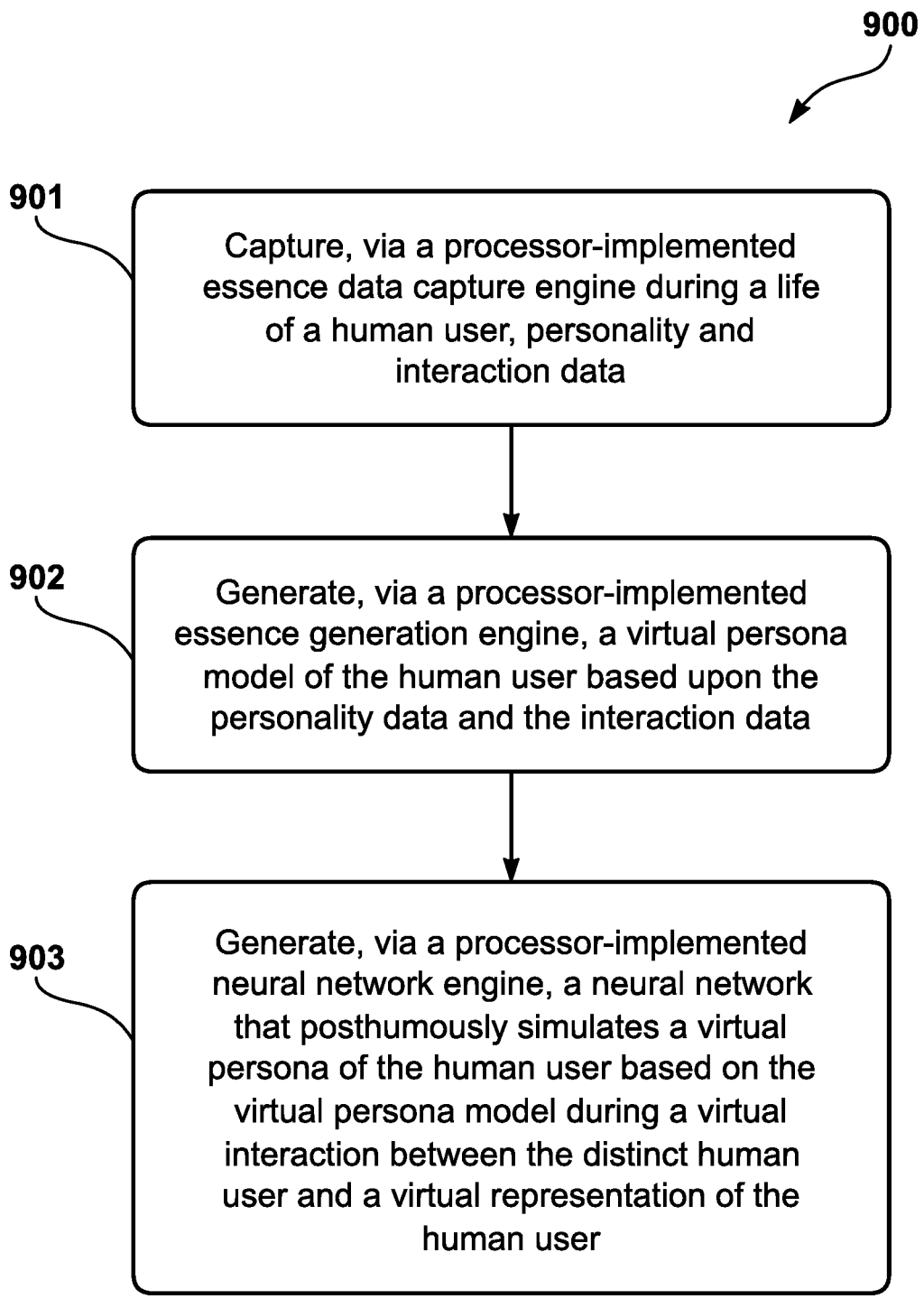
FIG. 9 illustrates a computer-implemented process that may be utilized to generate a posthumous virtual simulation of the human user.

FIG. 9 illustrates a computer-implemented process 900 that may be utilized to generate a posthumous virtual simulation of the human user 108. At a process block 901, the process 900 captures, via a processor-implemented essence data capture engine 103 during a life of the human user 108, personality data and interaction data. The personality data connotes one or more core characteristics of the human user 108, whereas the interaction data connotes one or more interactive characteristics of the human user 108 that are present during one or more real-world interactions with a distinct human user. Furthermore, at a process block 902, the process 900 generates, via a processor-implemented essence generation engine 102, a virtual persona model of the human user 108 based upon the personality data and the interaction data. Additionally, at a process block 903, the process 900 generates, via a processor-implemented neural network engine 105, a neural network that posthumously simulates a virtual persona of the human user 108 based on the virtual persona model during a virtual interaction between the distinct human user and a virtual representation of the human user 108.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A computer-implemented essence generation platform comprising:
a processor;
an essence data capture engine that captures, via the processor during a life of a human user, personality data and interaction data, the personality data connoting one or more core characteristics of the human user, the interaction data connoting one or more interactive characteristics of the human user that are present during one or more real-world interactions with a distinct human user;
an essence generation engine that generates, via the processor, a virtual persona model of the human user based upon the personality data and the interaction data, wherein the essence generation engine dynamically generates one or more variability patterns, without the one or more variability patterns being defined prior to capturing the personality data and the interaction data, subsequent to the essence data capture engine capturing at least a portion of the personality data and at least a portion of the interaction data, the one or more variability patterns being a non-discrete range of potential responses specific to the human user interacting with the distinct human user; and
a neural network engine that generates, via the processor, a neural network that posthumously simulates a virtual persona of the human user based on the virtual persona model during a virtual interaction between the distinct human user and a virtual representation of the human user.

2. The computer-implemented essence generation platform of claim 1, further comprising a memory device that stores a variability data structure have a plurality of variability patterns, a plurality of ranges of potential input values from the distinct human user corresponding to each of the plurality of variability patterns, and a plurality of predicted outputs of the human corresponding to each of the plurality of ranges of potential inputs values for each of the variability patterns.

3. The computer-implemented essence generation platform of claim 2, wherein the neural network engine comprises a machine learning engine that is trained according to the variability pattern data structure.

4. The computer-implemented essence generation platform of claim 3, wherein the machine learning engine generates a confusion matrix that determines predictive accuracy of the plurality of predicted outputs based upon a predictive accuracy threshold being met.

5. The computer-implemented essence generation platform of claim 4, wherein the machine learning engine modifies the variability pattern data structure to comply with the predictive accuracy threshold.

6. The computer-implemented essence generation platform of claim 2, wherein the potential input values consist of: potential keywords, potential response times, and potential sentiment, and potential emphatic behavior.

7. The computer-implemented essence generation platform of claim 1, wherein the essence data capture engine terminates capturing the personality data and the interaction data based upon the one or more variability patterns exceeding a predetermined redundancy threshold.

8. The computer-implemented essence generation platform of claim 1, wherein the essence data capture engine generates one or more data capture commands upon receiving one or more function calls, from one or more webhooks associated with one or more computing devices operated by the human user during the life of the human user, via an application programming interface.

9. The computer-implemented essence generation platform of claim 8, wherein the one or more webhooks are implemented via one or more input modalities consisting of: a computer-implemented personality test, one or more text messages, and one or more emails.

10. A computer program product comprising a non-transitory computer useable storage device having a computer readable program, wherein the computer readable program when executed on a server computer causes the server computer to:

capture, via a processor-implemented essence data capture engine during a life of human user, personality data and interaction data, the personality data connoting one or more core characteristics of the human user, the interaction data connoting one or more interactive characteristics of the human user that are present during one or more real-world interactions with a distinct human user;

generate, via a processor-implemented essence generation engine, a virtual persona model of the human user based upon the personality data and the interaction data, wherein the processor-implemented essence generation engine dynamically generates one or more variability patterns, without the one or more variability patterns being defined prior to capturing the personality data and the interaction data, subsequent to the essence data capture engine capturing at least a portion of the personality data and at least a portion of the interaction data, the one more variability patterns being a non-discrete range of potential responses specific to the human user interacting with the distinct human user; and generate, via a processor-implemented neural network engine, a neural network that posthumously simulates a virtual persona of the human user based on the virtual persona model during a virtual interaction between the distinct human user and a virtual representation of the human user.

11. The computer program product of claim 10, wherein the server computer is further caused to store, at a memory device, a variability data structure having a plurality of variability patterns, a plurality of ranges of potential input values from the distinct human user corresponding to each of the plurality of variability patterns, and a plurality of predicted outputs of the human corresponding to each of the plurality of ranges of potential inputs values for each of the variability patterns.

12. The computer program product of claim 11, wherein the neural network engine comprises a machine learning engine that is trained according to the variability pattern data structure.

13. The computer program product of claim 12, wherein the machine learning engine generates a confusion matrix that determines predictive accuracy of the plurality of predicted outputs based upon a predictive accuracy threshold being met.

14. The computer program product of claim 13, wherein the machine learning engine modifies the variability pattern data structure to comply with the predictive accuracy threshold.

15. The computer program product of claim 11, wherein the potential input values consist of: potential keywords, potential response times, and potential sentiment, and potential emphatic behavior.

16. The computer program product of claim 10, wherein the essence data capture engine terminates capturing the personality data and the interaction data based upon the one or more variability patterns exceeding a predetermined redundancy threshold.

17. The computer program product of claim 10, wherein the essence data capture engine generates one or more data capture commands upon receiving one or more function calls, from one or more webhooks associated with one or more computing devices operated by the human user during the life of the human user, via an application programming interface.

18. The computer program product of claim 17, wherein the one or more webhooks are implemented via one or more input modalities consisting of: a computer-implemented personality test, one or more text messages, and one or more emails.

* * * * *